Jan. 5, 1971  R. E. NOVKOV  3,551,977
BLADE-LIKE CUTOFF TOOL
Filed April 8, 1969
2 Sheets-Sheet 1
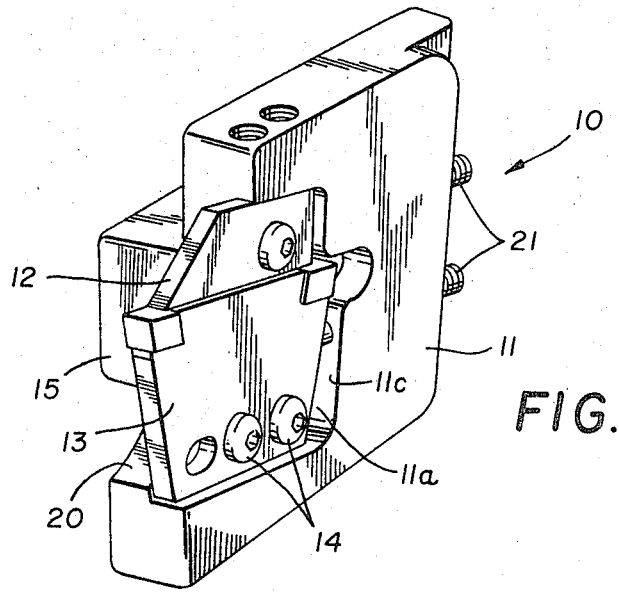
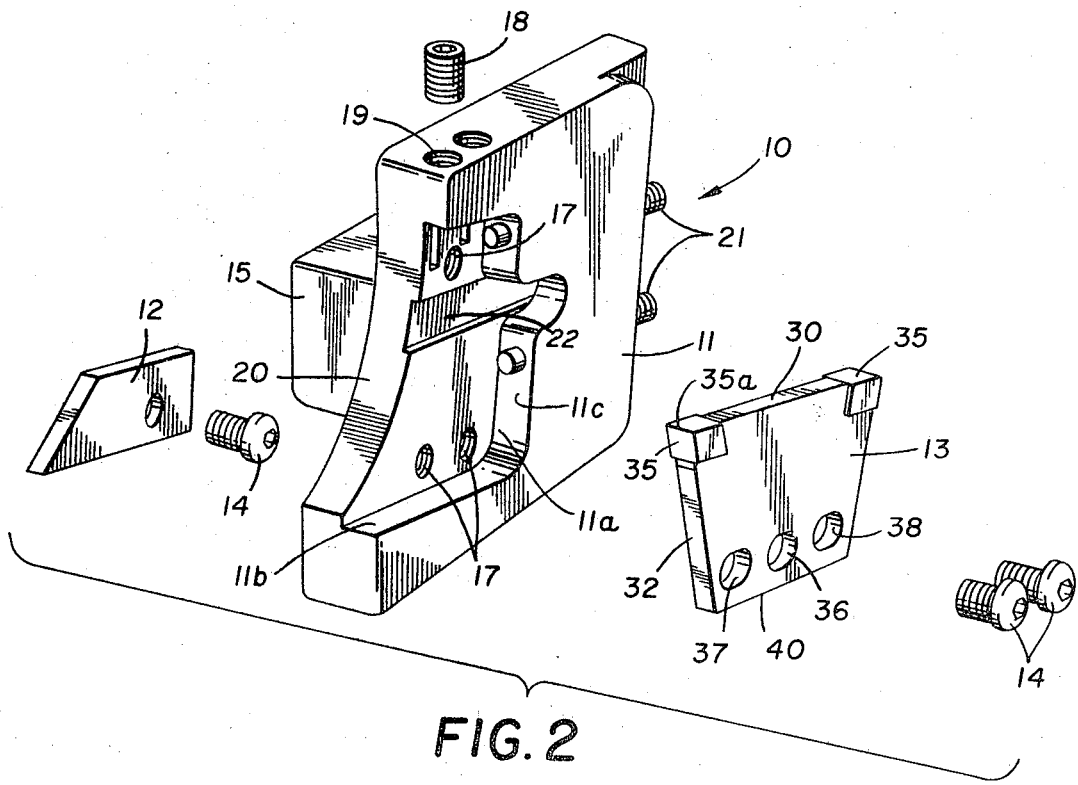
INVENTOR.
RAYMOND E. NOVKOV
BY
Freeman & Taylor
ATTORNEYS Jan. 5, 1971  R. E. NOVKOV  3,551,977

BLADE-LIKE CUTOFF TOOL

Filed April 8, 1969  2 Sheets-Sheet 2

INVENTOR.
RAYMOND E. NOVKOV
BY Freeman & Taylor
ATTORNEYS

United States Patent Office 3,551,977
Patented Jan. 5, 1971

3,551,977
BLADE-LIKE CUTOFF TOOL
Raymond E. Novkov, Cuyahoga Falls, Ohio, assignor to The Warner & Swasey Company, Cleveland, Ohio
Filed Apr. 8, 1969, Ser. No. 814,287
Int. Cl. B26d 1/00
U.S. Cl. 29—96
12 Claims

ABSTRACT OF THE DISCLOSURE

A unique cutoff tool that features the use of a consumable blade-type insert that is made double ended for reversibility and that is characterized by a unique geometry wherein a mounting aperture is spaced midway between the ends with the length to height ratio of the unit of the insert being approximately two to one.

The insert used may be either a unitary insert or one provided with carbide tips and the number of mounting holes employed is variable and may be eliminated entirely so long as the mounting point is midway between the reversible cutting edges.

RELATED APPLICATIONS

Although applicant has many co-pending applications on cutoff inserts at the present time all of these relate to the so-called "bit" configuration as contrasted to the "blade-like" configuration that is the subject of this application.

BACKGROUND OF THE INVENTION AND DESCRIPTION OF THE PRIOR ART

In the art of metal cutoff, pressures are absorbed in the direction that is downward with respect to the cutting component per se and as a result of this, the prior art has long used a knife-like or blade-like configuration when attempting cutoff operations.

Initially, the machinist grinding his own cutoff tool, would grind the tool bit so that a blade-like configuration projected from the frontal portion of the tool.

The next improvement along those lines included the use of a consumable blade-like portion that could be repetitively sharpened if wear occurred.

Luers U.S. Pat. 2,223,831 is representative of this initial blade type construction with it being noted in Luers, as well as in all prior art, that the requisite front, side and back clearance angles are provided in known fashion so that the maximum width of the cutoff tool exists at the cutting edge where contact is made with the rotating work piece.

The next major variation in the field of cutoff occurred in the 1950's as disclosed best in Novkov U. S. Pat. 2,964,833. In essence, the Novkov concept set forth in the above mentioned patent disclosed a new geometry for the consumable component by making the same more or less pencil-like in its configuration and providing means for interlocking the same with a blade-like support blade.

In making such insert with an approximately square cross section, strength characteristics not heretofore known were achieved because of the fact that the overall combination of blade and insert closely approached the blade per se construction of Luers, for example, with respect to overall strength under deflection conditions.

Tooling of this type has enjoyed wide-spread commercial success and is in current use world wide.

SUMMARY OF THE INVENTION

By the present invention, to some extent the Novkov geometry has been reversed to produce a blade-like geometry having some characteristics of the prior art but differing materially therefrom in some details that will now be discribed.

Specifically, applicant has made the blade-like insert of this invention reversible so as to effectively double the life of any given insert. Further, an insert has been defined that has a unique geometry that permits maximum cutting effiicency with a minimum sized cutting insert. In this regard, applicant has discovered, by creating a geometry wherein the length to height ratio is reduced to approximately a 2:1 ratio, that a centrally or midway located opening can be effectively employed to secure the unit with respect to its mounting body in the line of cutting force.

In this regard, applicant discloses in one form of the invention, the use of at least one mounting hole that is located near the bottom edge of the insert and by this arrangement, the resultant forces that occur during the cutoff are transmitted directly towards the point of support while the minimum length is such that clearance of the mounting fastener is accomplished for the depth of cut intended. This advantage can also be obtained by other mounting means such as, for example, magnets so long as the point of support is located at substantially the same location as the apertures just described.

Applicant has discovered that the insert in question works well whether made of unitary construction or whether provided with carbide tips, although it is obvious that carbide tipping does permit a greater wear resistance to be encountered than would otherwise be the case.

Production of the improved insert having the above noted characteristics accordingly becomes the principal object of this invention with other objects of the invention becoming more apparent upon a reading of the following brief specification, considered and interpreted in view of the accompanying drawings.

Of the drawings: FIG. 1 is a perspective view of the improved insert shown assembled in a cutoff tool.

FIG. 2 is a perspective view similar to FIG. 1 but being exploded for the sake of clarity.

Figure 3:
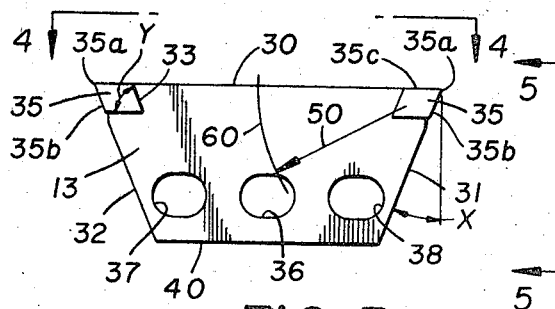
FIG. 3 is a side elevational view of an insert having tipped cutting components provided on opposite ends thereof.
Figure 4:
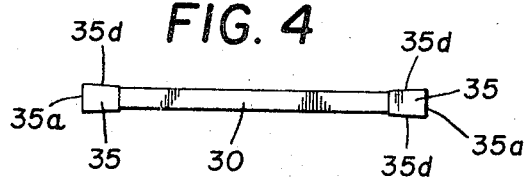
Figure 5:
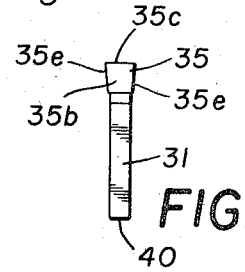

FIGS. 4 and 5 are views taken along the lines 4—4 and 5—5 of FIG. 3.

Figure 6:
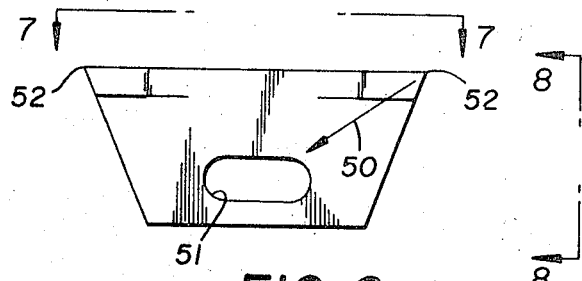

FIG. 6 is a view similar to FIG. 3 but showing a modified form of the invention wherein a unitary, high speed steel construction is employed.

Figure 7:
Figure 8:
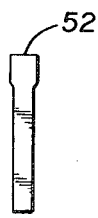

FIGS. 7 and 8 are views taken on the lines 7—7 and 8—8 of FIG. 6.

Figure 9:
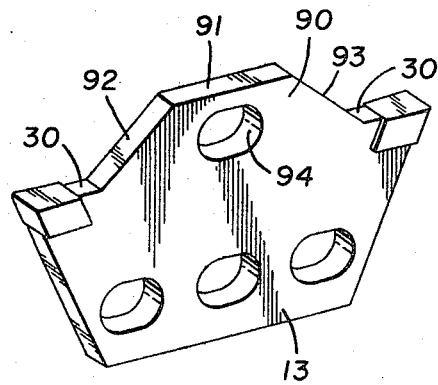

FIG. 9 is a perspective view of a still further modified form of the invention.

Referring now to the drawings and in particular to FIG. 1, the improved cutoff tool, generally designated by the numeral 10, includes a body portion 11 having a recessed pocket 11a within which cutting insert 13 and clamping arm 12 may be received with attachment of the just mentioned components being through bolts 14, 14 as is clearly obvious from FIGS. 1 and 2 of the drawings.

The body 10 further includes a mounting shank portion 15 as well as openings 17, 17 that are adapted to recive the bolt members 14, 14. Top clamping, through the medium of set screw 18 inserted in aperture 19, facilitates the clamping of insert to body while an arcuate cutout 20 is provided forwardly for the obvious purpose of clearance. The undercut 11a further includes a bottom wall 11b, a rear wall 11c and may or may not, depending upon the particular operation, provide for the inclusion of forwardly adjustable screws 21, 21 that serve to back up the insert 13 and clamp 12 as is clearly shown in FIG. 1. A clearance slot 22 is also provided in the body 10 adjacent the undercut 11a to permit clearance for the insert unit 35 when the tool is assembled as is shown in FIG. 1.

Turning now to FIG. 3, the preferred form of the invention shows a blade-like insert 13 that has a top edge 30 and a bottom edge 40 with these edges being parallel to each other so as to be intersected by opposed side edges 31, 32, with the edges 31, 32 being disposed at an acute angle X with respect to top edge 30 so that the blade converges from top to bottom as clearly shown in FIG. 3 of the drawings.

Adjacent the point of juncture between each side edge 31, 32, is provided a pocket 33 with pocket 33 being shown as defining an angle Y that is preferably less than 90° for reasons that will now be described.

In this regard, the pockets 33 receive a carbide or other hardened insert unit 35, 35 that has a cutting edge 35a, a front edge 35b and a top edge 35c with each cutting component being identical and with the units 35, 35 being substantially diamond shaped as is clearly apparent from the drawings. By the arrangement just described, the lower or rearmost edges of each insert 35 will seat within the pocket 33 and the resultant force factor that occurs during cutting will be directed downwardly in the direction of arrow 50 during normal conditions of operation.

Again referring to FIG. 3, it will be noted that a series of oval apertures 36, 37 and 38 are provided between the opposed edges 31 and 32 of the blade unit 13 with the aperture 36 being preferably located midway between opposed cutting edges 35a, 35a and further being located in relatively close proximity with the lower edge surface 40 so as to be in line of the force vector 50 as is clearly shown in FIG. 3.

In this regard, it will also be noted that all of the apertures 36, 37 and 38 are somewhat oval in outline so as to permit longitudinal shifting following grinding with the aperture 37 being used for support when the right hand cutting edge 35a is being employed for cutoff, while the aperture 38 is used when the insert is reversed so as to present the left hand cutting edge of FIG. 3 in cutting position.

It will also be noted that the distance or length of force vector 50 that is shown defines an arc 60 that extends just slightly beyond the midpoint of the insert as viewed in the side elevation. In this arrangement, it is clear that the maximum depth of cut, which is normally slightly less than one-half the length or equal to the height, can still be achieved while yet preventing interference with a bolt that is secured within the aperture 36.

In FIG. 3 it will be noted that in both instances, the carbide cutting components 35, 35 have front clearance provided on the front edges 35b while back clearance is shown on the opposed edges 35d, 35d in FIG. 4 and side clearance is provided in FIG. 5 on the edges 35e, 35e. The amount of such clearances are dependent upon the job being processed.

In use or operation of the improved insert shown in FIGS. 3 through 5, it will first be assumed that the component parts have been machined to the configuration shown in the drawings. At this time, it is merely necessary that the clamp 12 and insert 13 be positioned firmly in place at pocket 11a by use of screws 14, 14 and set screws 18, 18 with backup screws 21, 21 being employed to firmly lock the unit in position with the insert resting securely on the ledge 11b as is clearly shown in FIG. 1.

At this time, cutoff operation may be effecuated by merely moving the unit 10 into the path of the revolving work piece in a conventional manner.

When it is desired to change tools, or any one edge becomes dull, it is merely necessary to remove the bolts 14, 14 and either reverse or replace a consumable component insert 13 for resumption of the cutoff operation.

Turning now to the modified form of the invention shown in FIGS. 6 through 8, the same differs in construction from the form shown in FIGS. 3 through 6 in essentially two aspects as follows:

First, the same is of one piece construction with the units 35, 35 being replaced by an integral ground cutting edge 52 that extends transversely of the unit and with front clearance being provided as shown in FIG. 6, back taper being provided as in FIG. 7 and side clearance as is shown in FIG. 8.

The second point of difference relates to the use of a single opening 51 that is elongated as contrasted to the opening 36 but that still falls within the line of support for the vector 50 as clearly shown in FIG. 6. In this regard, it is to be noted that the force direction vector factor 50 can vary over a range of angular degrees during actual cutoff depending upon the rate of feed and sharpness of edge 52. It will be noted, however, that by the construction shown, applicant, in either FIGS. 3 through 5 on the one hand, or FIGS. 6 through 8 on the other hand, that the angle of this force vector can vary considerably before it will be outside the point of support offered by the mid-apertures 36 and 51.

Use in operation of the insert described in FIGS. 6 through 8 is similar to that previously described with respect to FIGS. 3 through 5.

Turning now to the modified form of the invention shown in FIG. 9, this unit is contoured to operate without using the clamp member 12 that has been previously discussed in connection with FIGS. 1 through 8 of the drawings. Accordingly, the same includes an upperly projecting body extension 90 that extends upwardly from the upper edge 30 of insert member 13 that otherwise conforms to the construction earlier described in connection with FIGS. 3 through 5 of the drawings.

The height of the projection 90 corresponds to the height of the clamp 12 and includes a top edge 91 and angular edges 92 and 93 with the edge 91 being contracted by the bolts 18, 18 while the edges 92 and 93 respectively serve as chip diverting surfaces, depending upon their position of attachment. An aperture 94 is further provided to facilitate additional fastening much in the manner utilized in connection with securing of the clamp 12 to the body 10.

It will be seen from the foregong that there has been provided a new and improved type of cutoff tool that is characterized by an insert having a unique and different blade-like geometry that results in increased efficiency. It has been shown how the unit may be of the unitary or tipped type construction and further how the number and location of apertures and planar outline of the body may vary in accordance with individual needs.

The new geometry has several advantages that may be summarized as follows.

First, by production of a unit of this type, it is possible to make the same compatible with respect to a tool body of the type shown so as to provide for firm support directly beneath the point of cutout. This is in direct contrast to the cantilever type of support shown in Novkov Pat. 2,964,833.

Second, by making the tool symmetrical, it is not only balanced in operation, but also has an extended life period of use.

Third, by locating the fastening means of the tool midway between the cutting edges and at fairly close proximity to the lower edge, the point of support between blade and body is evident by its connection directly in line with the resultant force factor that is received by the cutoff tool during use. As a result of this, turning movement around the point of support is of course minimized because of the fact that there is either no lever arm at all or a minimum length arm through which such turning force could be exerted.

It is to be understood that, while apertures are shown in the preferred embodiment, other mounting means such as magnets, mechanical connections, or the like could be employed if desired, provided the same were located as above described and that in such case the apertures for bolts would not be required.

While a full and complete description of the invention has been set forth in accordance with the dictates of the patent statutes, it is to be understood that the invention is not intended to be limited to the specific form herein shown. Accordingly, modifications of the invention may be resorted to without departing from the spirit hereof or the scope of the appended claims.

What is claimed is:

1. A double-ended, reversible blade-type cutoff insert of the character described, comprising:
   (A) a thin flat body having
      (1) top and bottom edges having parallel portions at their extremities
      (2) opposed side edges that are disposed
         (a) at substantially equal acute angles with respect to said top edge whereby said body decreases in width from top to bottom edge;
   (B) opposed cutting edges
      (1) defined by the intersection of said top edge with said side edges
      (2) extending transversely of said body;
   (C) mounting means
      (1) defined by at least one aperture communicating one planar face of said body with the remaining planar face thereof
      (2) being located midway between said cutting edges in relatively close proximity to said bottom edge;
   (D) the distance along said top edge between said cutting edges being approximately twice the distance between said top and bottom edges.

2. A double-ended, reversible, blade-type cutoff insert of the character described, comprising:
   (A) a thin flat body having
      (1) top and bottom edges having parallel portions at their extremities
      (2) opposed side edges that are disposed
         (a) at substantially equal angles with respect to said top edge whereby said body decreases in width from top to bottom edge;
   (B) opposed cutting edges
      (1) defined by the intersection of said top edge with said side edges
      (2) extending transversely of said body;
   (C) mounting means
      (1) defined by at least one aperture communicating one planar face of said body with the remaining planar face thereof
      (2) being located symmetrically with respect to the centerline of said body between said cutting edges;
   (D) the distance along said top edge between said cutting edges being approximately twice the distance between said top and bottom edges.

3. A double ended, reversible, blade-type cutoff insert of the character described, comprising;
   (A) a thin flat body having
      (1) parallel top and bottom edges
      (2) opposed side edges that are disposed
         (a) at substantially equal angles with respect to said top edge whereby said body decreases in width from top to bottom edge;
   (B) opposed cutting edges
      (1) defined by the intersection of said top edge with said side edges
      (2) extending from one planar face of said body to the other planar face thereof in each instance;
   (C) mounting means
      (1) defined by at least one aperture communicating one planar face of said body with the remaining planar face thereof
      (2) being located midway between said cutting edges in relatively close proximity to said bottom edge.

4. The device of claim 1 further characterized by
   (A) the fact that said cutting edges have an acute angle relationship between the top and front edges and are received in complementally shaped pockets provided on said body in these regions;
   (B) a theoretical diagonal line from said cutting tip to a diagonally opposed point thereof extending through said mounting means whereby the resultant force of cutoff is absorbed in part by said mounting means during operation.

5. The device of claim 1 further characterized by the fact that said "midway" aperture of said mounting means is spaced from either said cutting edge by a distance that slightly exceeds one-half the overall length of said top edge.

6. The device of claim 2 further characterized by
   (A) the fact that said cutting edges are part of diamond shaped cutting tips received within acute angle pockets on said body;
   (B) a theoretical diagonal line from said cutting tip to a diagonally opposed point thereof extending through said mounting means whereby the resultant force of cutoff is absorbed in part by said mounting means during operation.

7. The device of claim 2 further characterized by the fact that said "midway" aperture of said mounting means is spaced from either said cutting edge by a distance that slightly exceeds one-half the overall length of said top edge.

8. The device of claim 3 further characterized by
   (A) the fact that said cutting edges are part of diamond shaped cutting tips received within acute angle pockets on said body;
   (B) a theoretical diagonal line from said cutting tip to a diagonally opposed point thereof extending through said mounting means whereby the resultant force of cutoff is absorbed in part by said mounting means during operation.

9. The device of claim 3 further characterized by the fact that said "midway" aperture of said mounting means is spaced from either said cutting edge by a distance that slightly exceeds one-half the overall length of said top edge.

10. A double-ended, reversible, blade-type cutoff insert of the character described, comprising;
    (A) a thin flat body having
       (1) top and bottom edges having parallel portions at their extremities
       (2) opposed side edges that are disposed
          (a) at substantially equal angles with respectto said top edge whereby said body decreases in width from top to bottom edge;
    (B) opposed cutting edges
       (1) defined by the intersection of said top edge with said side edges
       (2) extending transversely of said body;
    (C) mounting means
       (1) operatively extending transversely of said body at a point that is in closer proximity to said lower edge than said top edge, and
       (2) being located midway between said cutting edges;
    (D) the distance along said top edge between said cutting edges being approximately twice the distance between said top and bottom edges.

11. A double-ended, reversible, blade-type cutoff insert of the character described, comprising;
    (A) a thin flat body having
       (1) top and bottom edges having paralled portions at their extremities
       (2) opposed side edges that are disposed
          (a) at substantially equal angles with respect to said top edge whereby said body decreases in width from top to bottom edge;
- (B) opposed cutting edges
  - (1) defined by the intersection of said top edge with said side edges
  - (2) extending transversely of said body;
- (C) mounting means
  - (1) being located midway between said cutting edges;
- (D) the distance along said top edge between said cutting edges being approximately twice the distance between said top and bottom edges.

12. In combination,
- (A) a tool body having a shallow pocket on one side face thereof;
- (B) a double-ended, reversible blade-type cutoff insert adapted to be received in said pocket and comprising
  - (1) a thin flat body having
    - (a) top and bottom edges having parallel portions at their extremities
    - (b) opposed side edges that are disposed at substantially equal angles with respect to said top edge whereby said body decreases in width from top to bottom edge;
    - (c) the planar outline of said body approximating the planar outline of said pocket whereby said body may be received in said pocket for projection forwardly of said tool
  - (2) opposed cutting edges
    - (a) defined by the intersection of said top edges with said side edges
    - (b) extending transversely of said body,
- (C) mounting means
  - (1) operatively extending transversely of said body at a point that is in closer proximity to said lower edge than to said top edge
  - (2) being located midway between said cutting edges,
- (D) the distance along said top edge between said cutting edges being approximately twice the distance between the said top and bottom edges.

References Cited
UNITED STATES PATENTS

| | | | |
|---|---|---|---|
| 1,865,148 | 6/1932 | Stade | 29—96 |
| 2,127,231 | 8/1938 | Morris | 29—96 |
| 2,836,240 | 5/1958 | Nuding | 29—96 |
| 3,205,558 | 9/1965 | Stier | 29—96 |

HARRISON L. HINSON, Primary Examiner